No. 701,452. Patented June 3, 1902.
S. YOUNG.
DRAWING OFF TAP FOR AERATED LIQUIDS.
(Application filed Jan. 22, 1902.)
(No Model.)
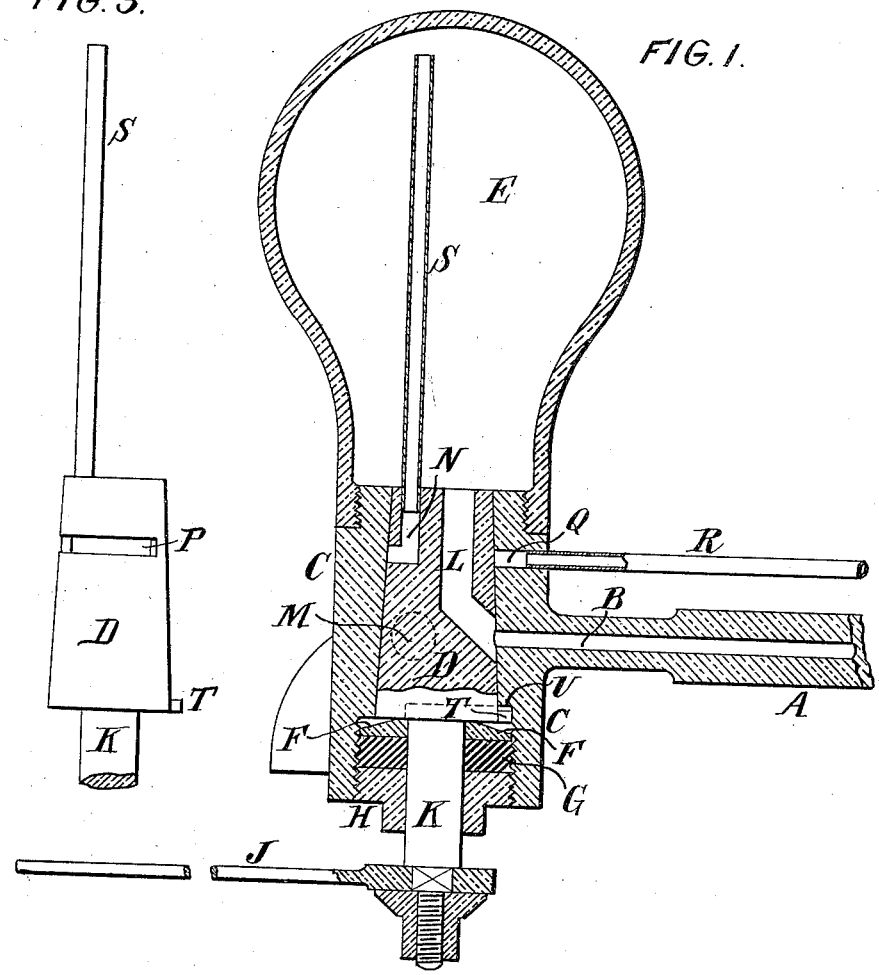
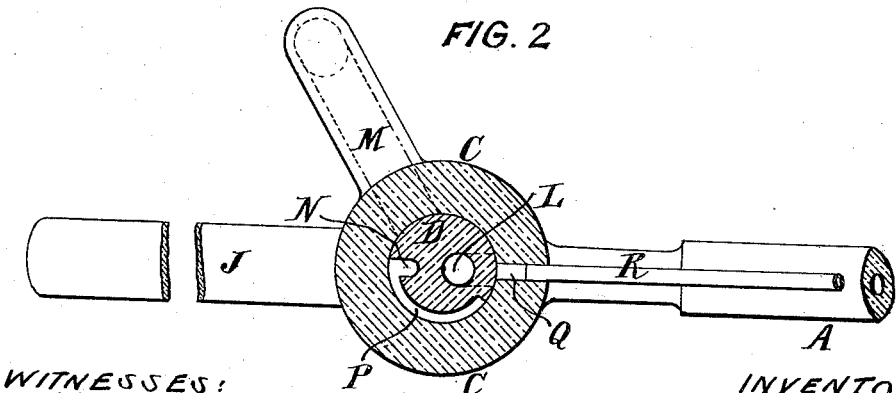
WITNESSES:
F. W. Wright
S. C. Connor
INVENTOR
STEPHEN YOUNG
BY
Howson and Howson
HIS ATTORNEYS

UNITED STATES PATENT OFFICE.

STEPHEN YOUNG, OF GLASGOW, SCOTLAND.

DRAWING-OFF TAP FOR AERATED LIQUIDS.

SPECIFICATION forming part of Letters Patent No. 701,452, dated June 3, 1902.

Application filed January 22, 1902. Serial No. 90,798. (No model.)

*To all whom it may concern:*

Be it known that I, STEPHEN YOUNG, a subject of the King of Great Britain and Ireland, and a resident of Glasgow, Scotland, (whose postal address is 11 West Regent street, Glasgow, Scotland,) have invented certain new and useful Improvements in Drawing-Off Taps for Aerated Liquids, (for which I have applied for British patent, No. 13,172, dated June 28, 1901,) of which the following is a specification.

My said invention relates to drawing-off taps such as are used for supplying aerated liquids on draft, and has for its object to improve the construction of such taps, so that while being comparatively simple and inexpensive to make they will also act in an efficient manner when supplying the desired quantity of the aerated liquid.

In carrying out my invention the aerated liquid is contained, as usual, in a reservoir under high pressure. The reservoir is connected by a pipe and plug-cock with a measuring vessel, and passages in the cock are arranged so as to open communication in turn, first, between the reservoir and the measuring vessel, then that vessel fills and further movement of the cock closes the inlet and opens communication, secondly, between the vessel and the atmosphere, allowing the confined gas in the vessel above the liquid therein to escape to the atmosphere, and the continued movement of the cock opens communication, thirdly, between the measuring vessel, the atmosphere, and the discharge, so that the liquid leaves the measuring vessel quietly and so that the gas in the liquid is not separated therefrom.

My improved drawing-off tap is shown in the accompanying sheet of drawings, to be hereinafter referred to in particularly describing my improvements.

Figure 1 is a vertical section, and Fig. 2 a horizontal section, while Fig. 3 is an elevation of the plug-cock.

The aerated liquid is contained, as usual, in a reservoir (not shown) under high pressure. The reservoir is connected by a pipe A with an inlet-port B in the barrel or casing C of a valve or cock D, the barrel C being screwed to the lower end or base of a measuring vessel E, of metal, glass, or other suitable material, of a size to contain the desired quantity of liquid to be supplied and supported in any suitable manner. The smaller end of the tapering plug-cock D is upward, and the cock is held in position in the barrel C by a washer F, packing G of any suitable kind, and a nut H, screwed into the lower end of the barrel. A handle J is fitted on the lower end of the spindle K of the plug D, this plug being made with a passage L, the upper end of which communicates with the interior of the measuring vessel E, the other end forming a port in the circumference of the plug D opposite the level of the inlet-port B and of a discharge M in the barrel C. The plug D has also formed through it a small vertical passage N, the lower end of which communicates with a horizontal groove P in the plug, (or it might be in the barrel,) so that the vertical passage N can be made to communicate, as hereinafter described, with a passage Q, formed through the barrel C and connected to a pipe R, open to the atmosphere. The small passage N has connected to it at its upper end a tube S, extending up to near the top of the interior of the measuring vessel. The packing G at the lower end of the plug D while preventing the possibility of leakage has a resilient action, which facilitates the movement of the plug, and the narrow end of the plug being upward it is impossible for the pressure to jam the plug, and so prevent its turning.

As shown in the drawings, the parts are in the position in which the main port or passage L in the plug D is opposite the inlet-port B in the barrel C, and the aerated liquid will rise through the passage L into the measuring vessel E with a minimum disturbance in its passage of the gas and liquid. When the desired quantity of aerated liquid has passed into the measuring vessel E, the handle J is turned so as to first close the inlet-port B and then bring the groove P in the plug D opposite the passage Q through the barrel C. The gas confined above the liquid in the measuring vessel E then immediately passes down the tube S and escapes to the atmosphere, reducing the pressure in the measuring vessel E to that of the atmosphere. A further turning of the handle also brings the main passage L in the plug D in communication with the discharge-port M in the barrel C, and the aerated liquid flows out of the measuring vessel E through the passage L in the plug D and the discharge-port M into the glass or receptacle quietly and in such a manner that the gas contained in it is comparatively undisturbed and is not separated from the liquid to any extent. The communication with the atmosphere by the pipe S and passage Q remains open during this discharging operation to permit of the inflow of the atmosphere. The movement of the plug D in either direction is limited by a stop T on the plug working in a groove U in the barrel C, or the stop and groove may be transposed.

What I claim as my invention is—

1. A drawing-off tap for aerated liquids, comprising a measuring vessel, a vertical plug-cock fitted in the vessel with its narrow end upward, a barrel for the cock, packing and a screwed nut to hold the cock to its seat in the barrel, in combination with an air-passage, inlet and discharge passages in the barrel of the plug-cock, a main passage in the plug-cock to connect the measuring vessel with either a reservoir or a discharge-opening, and a second passage in the plug to connect the measuring vessel with the atmosphere, substantially as described.

2. In drawing-off taps for aerated liquids, in combination a measuring vessel, a vertical plug-cock fitted thereto with its narrow end upward and held to its seat by packing and a screwed nut, inlet and discharge passages in the barrel of plug-cock, a main passage extending through the plug from the level of the inlet and discharge to the interior of the measuring vessel; and a second passage in the plug connected at its upper end with a pipe extending up within the measuring vessel and having its lower end at the level of a passage through the barrel open to the atmosphere, substantially as and for the purposes herein set forth.

3. A tap and measuring vessel for drawing off aerated liquids comprising a barrel, a measuring vessel above said barrel, a cylindrical vertical central opening in the barrel, ports opening from the barrel outward, one to the reservoir, one to the atmosphere and one forming a discharge, a vertical plug in the cylindrical opening, a port therein adapted to be connected with the reservoir or the discharge, a groove adapted to be connected with the atmosphere-opening in the barrel and a tube carried by said plug extending into the measuring vessel and connecting with said groove, substantially as described.

4. A tap and measuring vessel for drawing off aerated liquids, comprising a barrel, a measuring vessel above it, a cylindrical tapered vertical plug within the barrel, said plug having its end of lesser area upward, a spindle at its other end and a nut to hold it in place, the plug having an opening L and a groove P and carrying an upwardly-extending tube, the barrel having an opening to the atmosphere, an opening to the container and a discharge-opening, as and for the purpose set forth.

In testimony whereof I have signed my name to this specification in the presence of two subscribing witnesses.

STEPHEN YOUNG.

Witnesses:
DAVID FERGUSON,
GEORGE PATTERSON.